United States Patent [19]
Khadkikar et al.

[11] Patent Number: 5,955,793
[45] Date of Patent: Sep. 21, 1999

[54] HIGH SENSITIVITY DIODE TEMPERATURE SENSOR WITH ADJUSTABLE CURRENT SOURCE

[75] Inventors: Prasad S. Khadkikar, Seville; James A. Tennant, Perrysville; Philip B. Eder, Mansfield, all of Ohio

[73] Assignee: Therm-O-Disc, Incorporated, Mansfield, Ohio

[21] Appl. No.: 09/023,013

[22] Filed: Feb. 11, 1998

[51] Int. Cl.$^6$ ............................................. H01H 35/00
[52] U.S. Cl. ........................... 307/117; 307/130; 307/126
[58] Field of Search .............................. 307/112, 117, 307/125–127, 130, 131, 138; 324/105, 441, 444, 501, 522, 524, 702, 703, 713; 361/93, 100, 101, 103; 257/106, 414, 467, 470, 471, 494

[56] References Cited

U.S. PATENT DOCUMENTS

| | | |
|---|---|---|
| 3,420,104 | 1/1969 | Troemel et al. . |
| 3,719,797 | 3/1973 | Andrews, Jr. et al. . |
| 3,722,283 | 3/1973 | Treharne et al. ........................ 374/170 |
| 3,780,322 | 12/1973 | Walters ................................... 327/584 |
| 3,791,217 | 2/1974 | Stout et al. ............................. 374/167 |
| 3,962,692 | 6/1976 | Murphy et al. ........................ 340/228 |
| 3,987,310 | 10/1976 | Peltier et al. ........................... 307/215 |
| 4,278,970 | 7/1981 | Streczyn et al. ....................... 340/599 |
| 4,316,202 | 2/1982 | Mori .......................................... 357/15 |
| 4,636,092 | 1/1987 | Hegyi . |
| 4,667,265 | 5/1987 | Stanojevic et al. ..................... 361/103 |
| 4,727,269 | 2/1988 | Luich ....................................... 307/530 |
| 4,943,740 | 7/1990 | Gulczynski ............................. 307/454 |
| 4,977,476 | 12/1990 | Marshall et al. ......................... 361/18 |
| 5,024,535 | 6/1991 | Winston, Jr. . |
| 5,070,322 | 12/1991 | Fujihira . |
| 5,154,514 | 10/1992 | Gambino et al. . |
| 5,289,043 | 2/1994 | Marshall et al. ......................... 307/38 |
| 5,401,099 | 3/1995 | Nishizawa et al. . |
| 5,781,076 | 7/1998 | Bolton, Jr. et al. ..................... 331/176 |

Primary Examiner—Jeffrey Gaffin
Assistant Examiner—Peter Zura
Attorney, Agent, or Firm—Jones, Day, Reavis & Pogue

[57] ABSTRACT

A high-sensitivity diode temperature sensor includes a reverse-biased diode, such as a Schottky diode, coupled to an adjustable constant current source for biasing the diode into a reverse operating region. The constant current source biases the diode at a particular reverse leakage current that corresponds to a temperature window over which the reverse voltage across the diode exhibits a linear response of several hundred mV/C. The change in reverse voltage can be used as a signal to switch power to an attached electrical load. Also disclosed is a dual-switchpoint temperature controller that incorporates the high-sensitivity diode temperature sensor with a feedback control circuit that enables the controller to switch power to a load at two adjustable setpoints using the single temperature sensor.

39 Claims, 4 Drawing Sheets

HIGH SENSITIVITY DIODE TEMPERATURE SENSOR WITH ADJUSTABLE CURRENT SOURCE

BACKGROUND OF THE INVENTION

The present invention is directed toward the field of solid state temperature sensors. In particular, a high-sensitivity diode temperature sensor circuit is disclosed that preferably comprises a reverse-biased diode, such as a Schottiy diode, coupled to an adjustable constant current source for biasing the diode into a reverse operating region. The constant current source biases the diode at a particular reverse leakage current that corresponds to a temperature window over which the reverse voltage across the diode exhibits a linear response of several hundred mV/C. The adjustable reverse leakage current sets the beginning of the temperature window over which the diode's reverse voltage will respond. This large change in diode voltage (from 100–500 mV/C) over a relatively small temperature window (from 5–20° C.) can be used as a signal to switch power to an attached electrical load.

In addition to disclosing the temperature sensor, the present application describes a control circuit that incorporates, as one element, the high sensitivity diode temperature sensor. The control circuit includes an innovative feedback mechanism that, in combination with the temperature sensor circuit, enables the controller to switch a load on and off at two adjustable set points using the single temperature sensor.

Presently known solid state temperature sensor circuits include: (1) integrated circuit temperature sensors; (2) forward-biased diode temperature sensors; (3) NTC/PTC thermistor circuits; and (4) complex reverse-biased diode temperature sensors that lack sensitivity and adjustability. Each of these presently known methods of measuring temperature suffer from several disadvantages that make them commercially or technically undesirable.

Integrated circuit ("IC") temperature sensors typically measure temperature using a pair of back-to-back forward-biased diode junctions. The difference in the biasing current level between the two diodes indicates the sensed temperature. Examples of these types of IC sensors include the TMP12 from Analog Devices and the LM34/35, available from National Semiconductor. These types of IC sensors suffer from several disadvantages. First, they are complex circuits that require external biasing and range-setting components, and thus consume valuable real estate on a printed circuit board ("PCB"). Second, they exhibit a relatively low temperature sensitivity (measured as the voltage output per degree of temperature change) in the range of only 5 to 20 mV/C. And third, they are expensive in comparison to discrete component circuits.

It is also known to use a discrete forward-biased diode as a temperature sensor. This type of sensor is disadvantageous, however, because a forward-biased diode exhibits a nonlinear change in output voltage with respect to temperature, and because the temperature sensitivity of such a forward-biased junction is very low, on the order of only –2 mV/C. In addition, the forward voltage drop from diode to diode in a given lot is generally inconsistent, which means that the biasing circuitry needed to operate such a diode must be customized for each sensor, if the circuits are to operate over the same temperature ranges. Furthermore, sensors that employ forward-biased diodes are generally not easily adjusted to switch at a different temperature point.

Another known solid state temperature sensor is the thermistor, either NTC or PTC. The thermistor circuit is relatively inexpensive and uncomplicated, however, it lacks adjustability. In addition, thermistor circuits that are biased to provide a narrow temperature "window" over which switching takes place generally require expensive high-gain amplification circuits.

Several prior art patents describe attempts to develop a high-sensitivity, adjustable solid state temperature sensor using a reverse-biased diode. These patents include U.S. Pat. No. 5,070,322 to Fujihira ("Fujihira"), U.S. Pat. No. 3,719, 797 to Andrews ("Andrews"), and U.S. Pat. No. 3,420,104 to Troemel ("Troemel").

Fujihira describes an overheating detection circuit including a reverse biased-diode coupled to a series of current amplification stages that amplify the reverse leakage current $(I_L)$ and provide this current to a MOSFET that converts the amplified current $(I_E)$ to a voltage. Fujihira does not include an adjustable constant current source that can be used to program the temperature setpoint at which the device switches, and, in addition, requires a costly and complex series of emitter-follower transistors for amplifying the leakage current of the diode sensor.

Andrews describes a sensor employing a pair of series connected reverse-biased Schottky diodes having dissimilar barrier heights. This circuit is not easily adjustable, does not employ a constant current source, and does not operate linearly over a particular temperature range. In addition, it requires the precise selection of two diodes having particular barrier heights.

Troemel describes a temperature sensor using a zener diode biased into its reverse-breakdown region. This circuit has a relatively poor sensitivity, does not employ an adjustable constant current source, and its temperature switch point is not easily changed.

Therefore, there remains a need in the art of solid state temperature sensors for an inexpensive, adjustable, high sensitivity temperature measurement device that exhibits a linear output response over a narrow temperature window that can be used as a signal to switch a motor, heater, lamp or other component that could be damaged by operating outside the temperature window.

SUMMARY OF THE INVENTION

The present invention overcomes the problems noted above and satisfies the needs in this field for a solid state temperature sensor that is inexpensive, adjustable, and exhibits a linear response and high temperature sensitivity over a programmable window of operation. The preferred sensor is a reverse-biased diode, and in particular a reverse-biased Schottky diode. Coupled to the reverse-biased diode is a constant current source that includes an adjustable component for setting the position of the switching window over which the diode exhibits a linear change in voltage with respect to temperature.

Certain types of mechanical devices, such as motors, heaters, lamps, compressors, etc., can be damaged if they are operated in an ambient environment that is either too hot or too cold. The present invention provides an adjustable temperature sensor that, in combination with a logic circuit and power switch, can be used to protect one of these mechanical devices by supplying a voltage level to the logic circuit that causes the power switch to remove power from the protected device. This sensor is highly immune to noise, and is therefore well suited for use in an appliance or other noisy environment, due to the fact that it exhibits a high temperature sensitivity of several hundred millivolts per degree Celsius over a narrow temperature window. The sensor can easily be used in a variety of applications and ambient temperature environments due to its included adjustable current source that is used to program the sensor to transition from a high reverse voltage to a low reverse voltage in a linear fashion over the temperature window.

A preferred application of the high sensitivity diode temperature sensor is a controller for controlling the application and removal of power from a load in a refrigeration, heat pump or air conditioning application, such as a defrost heater for a freezer, although, alternatively, the sensor can be used with a wide variety of appliances and other systems that need to switch power to a particular mechanical or electrical device when the ambient temperature of the system exceeds or falls below a particular level. As used in the preferred control circuit, the present invention includes the high-sensitivity diode temperature sensor, a feedback adjustment circuit, driver transistor, and a relay. The combination of the diode temperature sensor circuitry and the feedback adjustment circuit enables the preferred controller to switch at two adjustable temperature setpoints using only a single diode temperature sensor.

The present invention provides many advantages over presently known solid state temperature sensors, including: (1) the output of the sensor exhibits a linear voltage response over a relatively small temperature window, which can be used as a signal to switch power to a load; (2) the sensor is low cost and utilizes discrete components; (3) the sensor output is adjustable by altering the reverse leakage current provided by the constant current source; (4) the sensor provides a relatively high temperature sensitivity in the range of 100–500 mV/C over the linear temperature window; (5) when used as a temperature measuring device (and not a switch), the provides an accuracy of about +/−1° C.; and (6) the sensor is small in size, inexpensive to build and operate, and exhibits consistent operating characteristics from sensor to sensor.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
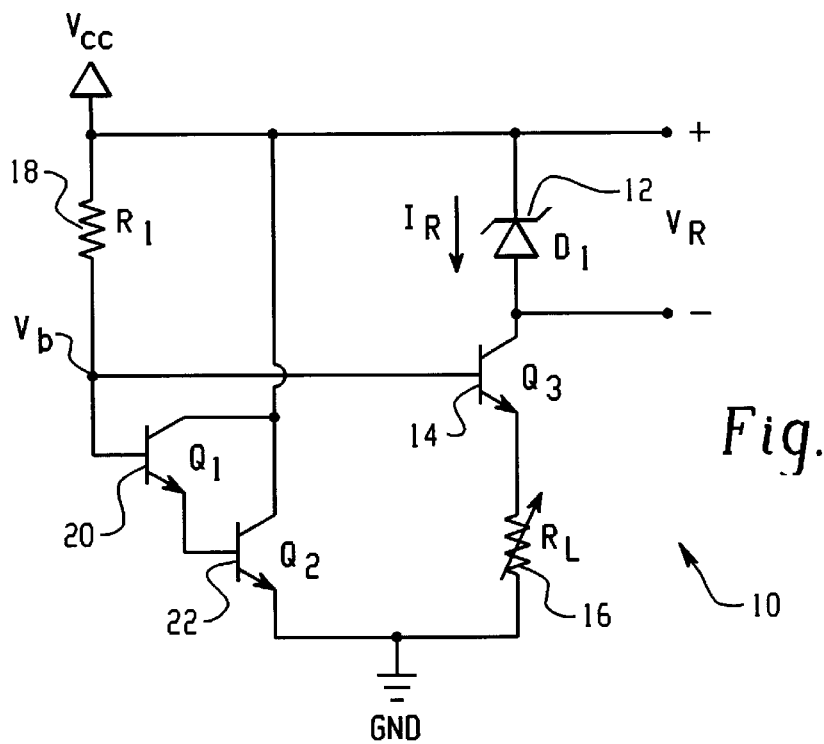
FIG. 1 is a circuit schematic of a preferred embodiment of a solid state temperature sensor having a reverse-biased Schottky diode coupled to an adjustable constant current source.

Referring now to the drawings, FIG. 1 sets forth a circuit schematic of a preferred embodiment of a solid state temperature sensor 10 having a reverse-biased Schottky barrier diode 12 coupled to an adjustable constant current source.

In the preferred embodiment of the present invention, the high-sensitivity diode sensor includes a reverse-biased Schottly diode 12, although other types of diodes that exhibit a relatively large reverse leakage current $I_R$ could be substituted for the Schottky diode 12.

The adjustable constant current source preferably includes bipolar junction transistors Q1, Q2 and Q3 (20, 22, 14), biasing resistor R1 18, and adjustable resistor $R_L$ 16. Other circuit configurations for the adjustable constant current source could be used in place of these elements, including a single transistor constant current source, many types of multi-transistor constant current sources, or op-amp current sources, to name a few. The important feature of a constant current source for use with the present invention is the ability to easily adjust the reverse leakage current $I_R$ that the constant current source pulls through the reverse-biased diode D1 12.

The constant current source operates as follows. Biasing resistor R1 18 and bipolar transistors Q1 20 and Q2 22 create a voltage level at node $V_B$ that is two $V_{BE}$ drops higher than the ground node. The two $V_{BE}$ drops correspond to the forward biased base-emitter junctions of Q1 20 and Q2 22. The voltage at node $V_B$ minus $V_{BE}$ of Q3, divided by the value of $R_L$, sets the current $I_R$ that the constant current source will try to pull through the diode sensor D1 12. The reverse leakage current $I_R$ that is applied to the diode sensor D1 12 can be adjusted by either varying the value of $R_L$, or by replacing $R_L$ with a different resistor. $R_L$ can be either a fixed resistor, in which case the resistor is replaced with a different valued resistor to adjust $I_R$, or it can be a potentiometer or variable resistor, in which case the potentiometer is varied to adjust $I_R$. In either case, the reverse leakage current $I_R$ can be easily adjusted in the circuit of the present invention.

The diode sensor D1 is preferably a Schottky diode, but could, alternatively be other types of diodes that exhibit large (>1 uA) reverse leakage currents. The Schottky diode, which is a metal-semiconductor junction, exhibits a relatively large (typically in the range of 10–75 uA) reverse leakage current. Because of this characteristically large reverse leakage current, costly and more complex amplification stages, as is known in some prior art circuits, are not required with the present invention. The reverse leakage current $I_R$ of a Schottky diode varies as a function of temperature (the greater the temperature, the larger the reverse leakage current). By fixing the reverse leakage current $I_R$ through the diode using a constant current source, the reverse voltage drop across the diode $V_R$ is forced to vary with a change in temperature from about 4.15 V to about 0.1 V. This voltage variation occurs over a fairly narrow temperature window of about 10–15 ° C., and within this temperature window the response of the diode (delta $V_R$ versus delta T) is nearly linear. Thus, over a narrow temperature delta of about 10–15° C., the sensor exhibits a very high sensitivity, typically on the order of 100–500 mV/C.

Figure 2:
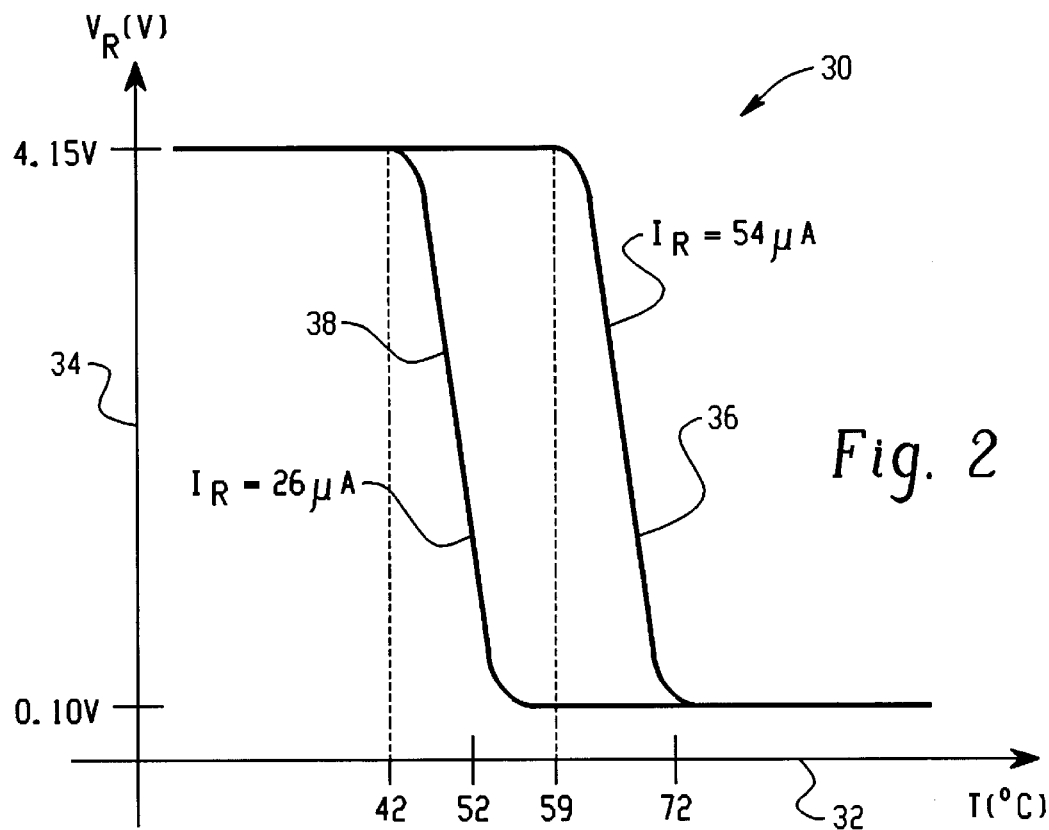
FIG. 2 is a typical plot of the reverse voltage ($V_R$) versus temperature (T) for the reverse-biased Schottky diode in FIG. 1 at two operating currents.
Figure 3:
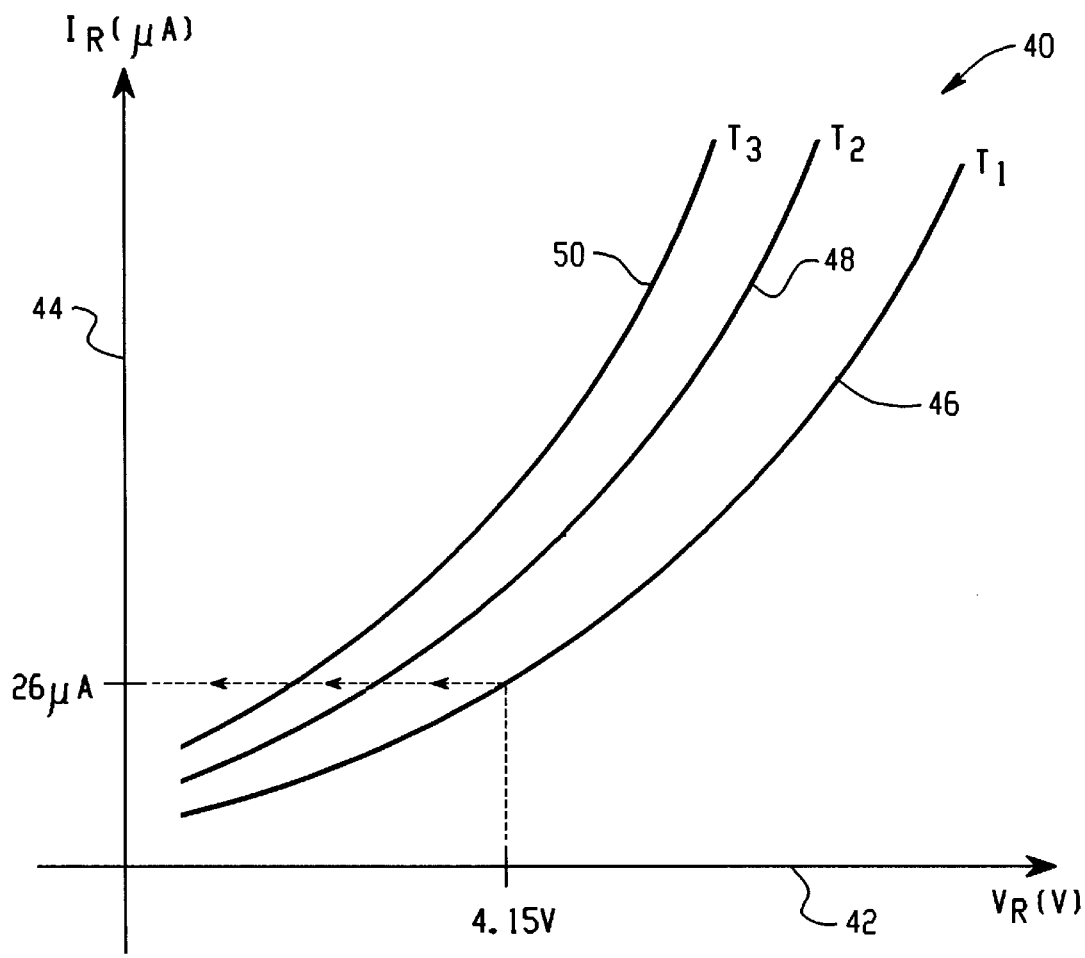
FIG. 3 is a typical plot of the reverse current ($I_R$) versus reverse voltage ($V_R$) for the reverse-biased Schottky diode in FIG. 1 at three example temperatures (T1–T3).

FIGS. 2 and 3 describe graphically the electrical operation and behavior of the circuit of FIG. 1. FIG. 2 is a typical plot of the reverse voltage ($V_R$) versus temperature (T) for the reverse-biased Schottky diode in FIG. 1 at two operating currents. The plot 30 sets forth voltage $V_R$ measured in volts (V) on the Y-axis 34, and temperature T measured in degrees Celsius (C) on the X-axis 32. Two operating points are shown in the plot, the first point 38 at a constant current $I_R$ of 26 uA, and the second point 36, at a constant current $I_R$ of 54 uA. This plot shows how adjusting the reverse leakage current $I_R$ causes a change in the temperature at which the diode voltage begins to switch (42° C. for a reverse current of 26 uA and 59° C. for a reverse current of 54 uA).

Consider curve 38. At a temperature below 42° C., the reverse voltage $V_R$ across the diode 12 is constant, about 4.15 V. This operating region represents the compliance limit of the constant current source. Any constant current source is limited by how much voltage it can provide to maintain the constant current. As the ambient temperature drops below 42° C., in this example curve, the current source reaches its compliance limit and the reverse voltage $V_R$ across the diode D1 is essentially clamped at 4.15 V (Vcc is about 5 V in this example). Since the voltage $V_R$ is constant in this region, as the temperature continues to decrease, so does the current $I_R$.

Now assume that the temperature is increasing on curve 38. As the temperature increases to 42° C., the constant current source returns to its adjusted level of 26 uA. Then, as the temperature continues to increase, the reverse voltage across the diode $V_R$ begins to collapse. As the temperature continues to increase the voltage across the diode $V_R$ will continue to fall as a linear function of temperature, until the voltage reaches a minimum value that is a characteristic of the properties and structure of the diode sensor D1 12. In the example of plot 30, the minimum reverse voltage drop that can be established across the diode is 0.1 V.

This operating region, from 42° C. to 52° C., represents a temperature "window" over which the reverse voltage response of the diode 12 exhibits a linear temperature dependance of several hundred millivolts per degree Celsius (mV/C). In the example of curve 38, the voltage drops from 4.15 V to 0.1 V over a span of approximately 10° C., resulting in a linear sensitivity of about 400 mV/C. Thus, over a fairly narrow temperature range (about 10° C.), the sensor of the present invention provides a very high sensitivity and a linear response.

As shown in FIG. 2, the output voltage $V_R$ of the diode sensor 12 operates like a temperature-dependant switch signal that can be used to protect motors, heaters, lamps or other potentially temperature sensitive elements that cannot operate above or below a particular temperature. The point at which the sensor "switches" can be easily adjusted in the circuit of the present invention by adjusting $R_L$, which moves the switching "window" up and down the X-axis of FIG. 2.

For example, consider a precision motor that will overheat and become damaged if it is operated in an ambient temperature environment that is greater than 72° C. The circuit of FIG. 1, adjusted such that the reverse leakage current $I_R$ is 54 uA, as shown in curve 36 of FIG. 2, provides a solution to protect this motor. By adjusting $R_L$ in FIG. 1 so that the reverse leakage current $I_R$ pulled from the diode is 54 uA, the output voltage of the diode can be programmed to collapse at about 72° C. This easily detectable voltage signal can then be coupled to a logic circuit and a power switch, such as a triac or a relay, to remove power from the sensitive motor when the temperature exceeds the threshold. Conversely, the circuit of FIG. 1 could be used to protect a device that cannot operate below a particular temperature, in which case the logic circuitry coupled to the output of the diode sensor 12 would operate by sensing a low-to-high reverse voltage transition, rather than a high-to-low transition as exhibited by increasing temperatures.

FIG. 3 sets forth a typical plot of the reverse current ($I_R$) versus reverse voltage ($V_R$) for the reverse-biased Schottky diode in FIG. 1 at three example temperatures (T1–T3). The plot 40 sets forth voltage $V_R$ measured in volts (V) on the X-axis 42, and current $I_R$ measured in micro-amps (uA) on the Y-axis 44. Three temperatures are plotted, T1, T2, and T3, respectively numbered 46, 48 and 50. In the plot, T1 is less than T2, which is less than T3. These plots show how the reverse-voltage $V_R$ varies as a function of temperature when the reverse leakage current $I_R$ is held constant.

Consider a constant current supply of 26 uA, as labeled on FIG. 3. At temperature T1, or less, the current source is operating in its compliance limit and the reverse voltage $V_R$ across the diode 12 is 4.15 V. As the temperature increases to T2 and then T3, the voltage across the diode drops in a linear fashion. Adjusting the reverse leakage current moves the operating point at which the diode begins to operate linearly to a higher or lower temperature, depending on whether the current $I_R$ is raised or lowered.

Figure 4:
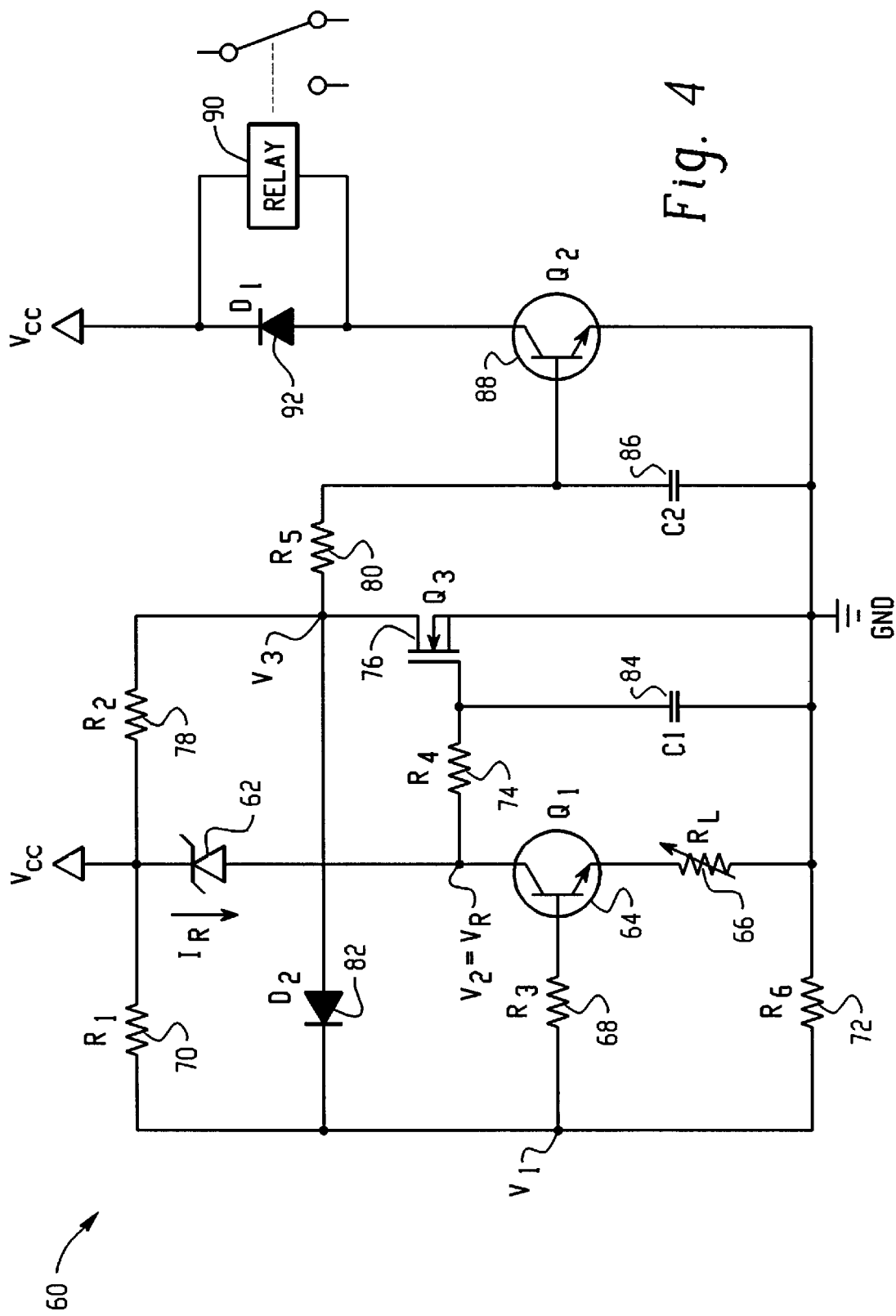
FIG. 4 is a circuit schematic of a defrost control circuit for refrigeration, heat pump or air conditioning applications including a high sensitivity diode sensor with adjustable current source.

Turning now to FIG. 4, a preferred application of the high-sensitivity diode sensor described in FIGS. 1–3 is presented. This circuit is a defrost controller that finds its primary use within a refrigeration unit, a heat pump, or an air conditioner, but which could be used in conjunction with other appliances. The circuit 60 includes a high-sensitivity diode temperature sensing circuit as described above, a feedback control circuit, a bipolar driver, and a switch.

The high-sensitivity diode temperature sensing circuit includes a reverse-biased Schottky diode DS 62, bipolar transistor Q1 64, biasing resistors R1 70, R3 68 and R6 72, and adjustable current setting resistor $R_L$ 66. The feedback control circuit includes a resistor R4 74, capacitor C1 84, MOSFET transistor Q3 76, biasing resistor R2 78 and feedback diode D2 82.

Figure 5:
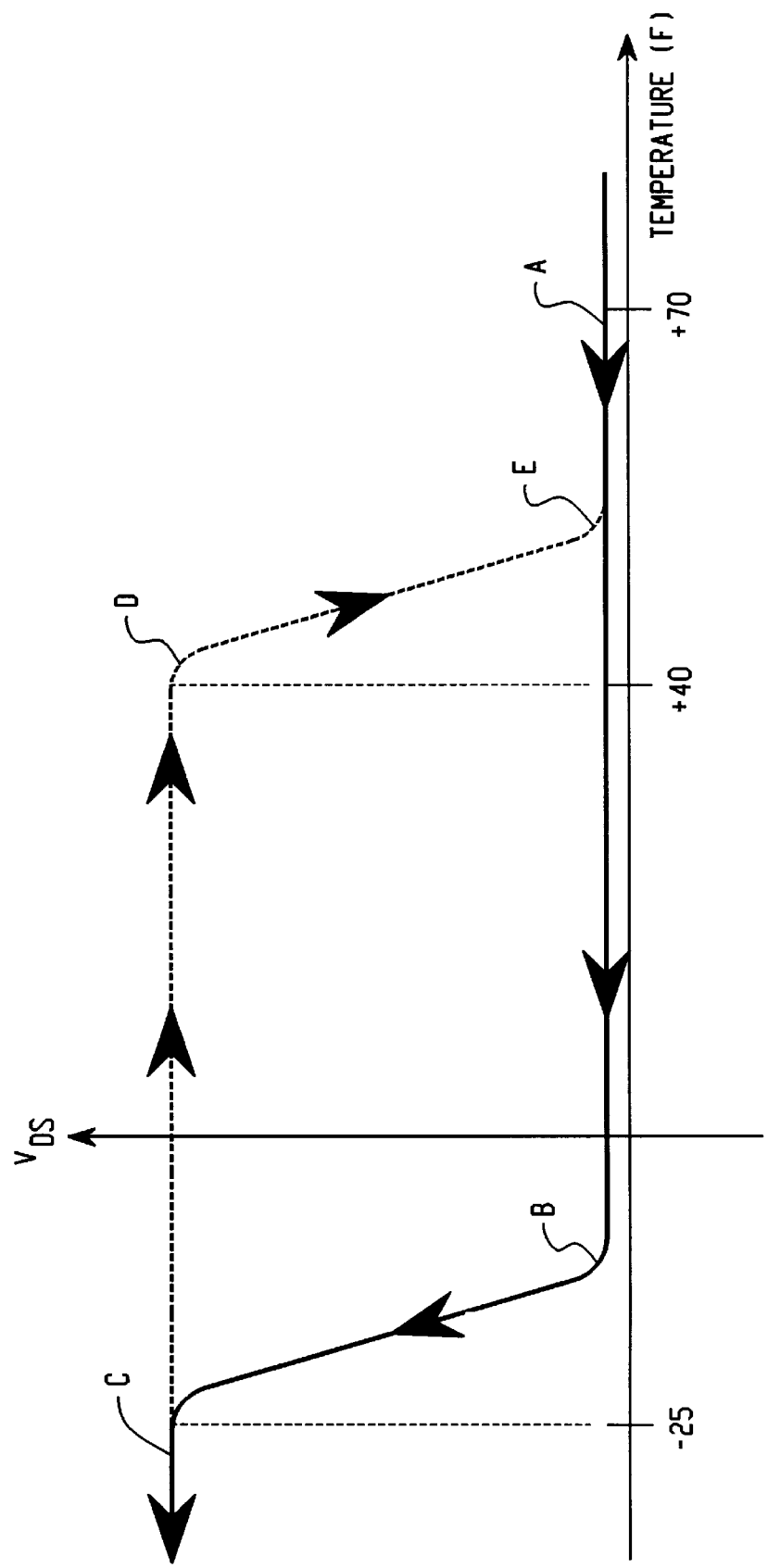
FIG. 5 is a typical plot of the reverse voltage ($V_R$) versus temperature (T) for the reverse-biased Schottky diode temperature sensor as used in the defrost control circuit of FIG. 4, showing the dual temperature switchpoint operation of the sensor.

The high-sensitivity diode temperature sensing circuit generally operates as described above in connection with FIGS. 1–3, except that in combination with the feedback control circuit, the temperature sensor of FIG. 4 exhibits a switching characteristic at two distinct temperature points, as shown in FIG. 5. The two switching points shown are at $T_{low}$=−25° F. (point C) and $T_{high}$=+40° F. (point D). These two points represent the temperatures at which the load connected to the defrost control circuit, typically a resistive heater, is turned on ($T_{low}$) and turned off ($T_{high}$).

For purposes of describing the operation of the defrost control circuit, assume that the ambient temperature is initially +70° F., point A on FIG. 5. At this temperature, R1, R3, $R_L$ and R6 set the reverse leakage current $I_R$ through the Schottky diode so that the voltage drop across the diode $V_{DS}$ is small, on the order of 0.1 V. The voltage at node V2 in FIG. 4 (the output of the temperature sensor) is therefore high. When V2 is high, the gate-to-source voltage ($V_{GS}$) across the MOSFET Q3 is greater than its threshold voltage ($V_T$), resulting in a high drain-to-source current ($I_{DS}$) through the MOSFET, which pulls the voltage at node V3 low. When V3 is low, bipolar driver Q3 is off and not conducting, which means that the relay 90 that applies power to the heater load is de-energized. An additional effect of V3 being low is that feedback diode D2 is reversed-biased, and the voltage at node V1 (which partly establishes the reverse leakage current $I_R$ through the reverse-biased diode temperature sensor 62) is at a low value, thus setting the first thermal switch point to be at −25° F. ($T_{low}$).

As the ambient temperature decreases along the solid black line in FIG. 5 from +70 to +40 to −25° F., $V_{DS}$ increases, causing V2 to decrease. The voltage reduction at node V2 causes $V_{GS}$ of Q3 to fall below the threshold value ($V_T$), which turns off the MOSFET. With no current flow ($I_{DS}$) through resistor R2, node V3 rises to a voltage level that will turn the driver transistor Q2 on and energize the relay 92, which applies power to the heater. With V3 no longer at a low value, feedback diode D2 becomes forward biased, causing the current through R6 to increase. The increased current through R6 causes node V1 to be at a higher voltage, thus establishing a higher reverse leakage current $I_R$ through the diode temperature sensor 62, changing its thermal switch point from the lower value of −25° F. to the higher value of +40° F.

As the heater operates it raises the ambient temperature of the appliance, causing the circuit to operate along the dotted curve from point C to point D to point E in FIG. 5. The higher reverse leakage current through diode 62 causes the reverse voltage $V_{DS}$ across the diode to remain relatively constant until approximately +40° F. (point D). Beyond this temperature, $V_{DS}$ collapses, causing node V2 to rise. Eventually V2 will rise to a point where $V_{GS}$ exceeds $V_T$ of the MOSFET, thus turning the device back on. The MOSFET will start to conduct current $I_{DS}$, which causes the voltage at node V3 to drop back down towards ground potential. As node V3 drops, bipolar transistor Q2 will eventually turn off, which de-energizes relay 92 and removes power from the defrost heater. The low value of V3 again reverse-biases feedback diode D2, resetting the thermal switch point back to −25° F. and the cycle can repeat.

FIG. 5 shows the dual temperature switching points (C, D) of the defrost controller of the present invention. The purpose of the defrost controller is to turn a heater on when the ambient temperature becomes too low (<−25° C.), and to turn the heater off when the ambient temperature reaches a second, higher temperature (40° C.). By using the high sensitivity diode temperature sensor of the present invention and the feedback control circuit described above, the defrost controller of FIG. 4 can produce a switching response as shown in FIG. 5, with two adjustable switchpoints for switching power to an attached heater.

Having described in detail the preferred embodiments of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A solid state temperature sensor, comprising:
    a reverse-biased Schottky diode; and
    an adjustable constant current source coupled to the diode for applying an adjustable reverse leakage current to the diode,
    wherein a voltage drop across the reverse-biased diode corresponds to a sensed temperature.

2. The solid state temperature sensor according to claim 1, wherein the adjustable constant current source includes at least one transistor.

3. The solid state temperature sensor according to claim 1, wherein the adjustable constant current source includes a bipolar transistor having a base, emitter and collector, and a current-setting resistor.

4. The solid state temperature sensor according to claim 3, wherein the current-setting resistor is a potentiometer.

5. The solid state temperature sensor according to claim 3, wherein the emitter of the bipolar transistor is coupled to the current-setting resistor, the collector is coupled to the reverse biased diode.

6. The solid state temperature sensor according to claim 3, wherein the adjustable constant current source further includes a biasing network coupled to the base of the bipolar transistor.

7. The solid state temperature sensor according to claim 6, wherein the biasing network includes a plurality of resistors.

8. The solid state temperature sensor according to claim 1, wherein the adjustable constant current source is a multi-transistor current source.

9. The solid state temperature sensor according to claim 8, wherein the multi-transistor current source includes a drive transistor, a current-setting resistor, and a biasing network, wherein the biasing network includes at least one resistor and a plurality of transistors for generating a voltage level at the base node of the drive transistor that sets the reverse leakage current through the reverse biased diode.

10. The solid state temperature sensor according to claim 1, wherein the diode and the reverse leakage current are selected such that the temperature sensitivity of the diode is at least 100 mV/C.

11. The solid state temperature sensor according to claim 1, wherein the reverse leakage current can be adjusted by altering the value of one component of the adjustable current source.

12. The solid state temperature sensor according to claim 1, wherein the reverse leakage current is at least 1 uA.

13. A dual-switchpoint temperature control circuit for switching power to a load at a first temperature and for removing power from the load at a second temperature, comprising:
    a diode temperature sensor biased to provide a switching signal at the first temperature;
    a feedback control circuit for adjusting the biasing of the diode temperature sensor to provide the switching signal at the second temperature; and
    a power switch coupled to the switching signal for switching power to the load in response to the first temperature and for removing power from the load in response to the second temperature.

14. The control circuit of claim 13, for use as a defrost controller, wherein the load is a heater and the first temperature is less than the second temperature.

15. The control circuit of claim 13, wherein the diode temperature sensor includes:
    a reverse biased diode; and
    an adjustable constant current source coupled to the diode for applying an adjustable reverse leakage current to the diode.

16. The control circuit of claim 15, wherein the reverse biased diode is a Schottky diode.

17. The control circuit of claim 15, wherein the feedback control circuit adjusts the biasing of the diode temperature sensor by altering the reverse leakage current applied by the constant current source.

18. The control circuit of claim 15, wherein the adjustable constant current source is a single transistor current source.

19. The control circuit of claim 18, wherein the single transistor current source includes a bipolar transistor having a base, emitter, and collector, and a current-setting resistor.

20. The control circuit of claim 19, wherein the current-setting resistor is a potentiometer.

21. The control circuit of claim 19, wherein the emitter of the bipolar transistor is coupled to the current setting resistor, and the collector is coupled to the reverse biased diode at a temperature sensing output node.

22. The control circuit of claim 19, wherein the single transistor current source further includes a biasing network coupled to the base of the bipolar transistor.

23. The control circuit of claim 22, wherein the biasing network includes a plurality of resistors.

24. The control circuit of claim 15, wherein the diode and the reverse leakage current are selected such that the temperature sensitivity of the diode is at least 100 mV/C.

25. The control circuit of claim 15, wherein the reverse leakage current is at least 1 uA.

26. The control circuit of claim 15, wherein the reverse voltage across the diode changes linearly from about 4 V to about 0.1 V for a supply voltage of 5 V over a temperature change of about 10° C.

27. The control circuit of claim 26, wherein the point at which the diode voltage begins to change corresponds to the first temperature when the diode is biased to provide a switching signal at the first temperature and corresponds to the second temperature when the feedback control circuit adjusts the biasing of the diode to provide the switching signal at the second temperature.

28. The control circuit of claim 13, wherein the feedback control circuit includes a diode for feeding back the switching signal to adjust the biasing of the diode.

29. The control circuit of claim 15, wherein the feedback control circuit includes a diode for feeding back the switching signal to adjust the reverse leakage current applied by the adjustable constant current source.

30. The control circuit of claim 21, wherein the feedback control circuit includes a diode coupled between the temperature sensing output node and the base of the bipolar transistor.

31. The control circuit of claim 21, wherein the feedback control circuit includes:
    a MOSFET connected to the temperature sensing output node; and
    a diode coupled between the MOSFET and the base of the bipolar transistor.

32. The control circuit of claim 13, wherein the power switch includes:
    a driver transistor; and
    a relay coupled to the driver transistor for switching power to the load.

33. A method of controlling the application of power to a load comprising the steps of:
    providing a reverse-biased diode temperature sensor;
    applying a reverse leakage current to the diode that corresponds to a first temperature switchpoint;
    sensing the first temperature switchpoint and generating a first switching signal that causes power to be applied to the load;
    feeding back the first switching signal to adjust the reverse leakage current applied to the diode corresponding to a second temperature switchpoint; and
    sensing the second temperature switchpoint and generating a second switching signal that causes power to be removed from the load.

34. The solid state temperature sensor of claim 1, wherein the adjustable constant current source is set at a current level where the voltage drop across the diode as a function of temperature change is approximately 100 to 500 millivolts per degree Celsius.

35. The solid state temperature sensor of claim 1, wherein the adjustable constant current source is set at a current level that defines a temperature window of approximately 5 to 25 degrees Celsius over which the voltage drop across the diode varies from about zero volts to about four volts.

36. The solid state temperature sensor of claim 35, wherein the variation in voltage drop across the diode over the temperature window is approximately linear.

37. A temperature sensor, comprising:
    a power supply;
    a Schottky barrier diode coupled to the power supply, wherein the voltage drop across the Schottky barrier diode corresponds to the sensed temperature; and
    a constant current source coupled to the Schottky barrier diode for applying a reverse leakage current to the diode, wherein the reverse leakage current is selected so that the voltage drop across the Schottky barrier diode varies linearly over a temperature window of approximately five to twenty degrees Celsius.

38. A dual-switchpoint temperature control circuit for switching power to a load at a first temperature and for removing power from the load at a second temperature, comprising:
    a diode temperature sensor biased to provide a switching signal at the first temperature, wherein the diode temperature sensor includes a reverse biased diode coupled between a power supply voltage and a temperature sensing node where the switching signal is provided, and an adjustable constant current source including a transistor coupled to the reverse biased diode;
    a feedback control circuit for adjusting the biasing of the diode temperature sensor to provide the switching signal at the second temperature, wherein the feedback control circuit includes a diode coupled between the temperature sensing node and the transistor; and
    a power switch coupled to the switching signal for switching power to the load in response to the first temperature and for removing power from the load in response to the second temperature.

39. A dual-switchpoint temperature control circuit for switching power to a load at a first temperature and for removing power from the load at a second temperature, comprising:
    a diode temperature sensor biased to provide a switching signal at the first temperature, wherein the diode temperature sensor includes a reverse biased diode coupled between a power supply voltage and a temperature sensing node where the switching signal is provided, and an adjustable constant current source including a transistor coupled to the reverse biased diode;
    a feedback control circuit for adjusting the biasing of the diode temperature sensor to provide the switching signal at the second temperature, wherein the feedback control circuit includes a MOSFET coupled to the temperature sensing node and a diode coupled between the MOSFET and the transistor; and
    a power switch coupled to the switching signal for switching power to the load in response to the first temperature and for removing power from the load in response to the second temperature.

* * * * *

UNITED STATES PATENT AND TRADEMARK OFFICE
CERTIFICATE OF CORRECTION

PATENT NO. : 5,955,793
DATED : September 21, 1999
INVENTOR(S) : Prasad S. Khadkikar et al.

It is certified that error appears in the above-identified patent and that said Letters Patent is hereby corrected as shown below:

Column 1, line 8, "Schottiy" should be --Schottky--.

Column 3, line 33, before "provides" insert --sensor--.

Column 4, line 12, "Schottly" should be --Schottky--.

Column 4, line 47, "(>1 uA)" should be --(> 1uA)--.

Signed and Sealed this

Twenty-seventh Day of March, 2001

Attest:

NICHOLAS P. GODICI

Attesting Officer

*Acting Director of the United States Patent and Trademark Office*